United States Patent [19]

Davis

[11] 4,014,291
[45] Mar. 29, 1977

[54] IMAGE DEVELOPING SYSTEM

[75] Inventor: Austin E. Davis, Nashua, N.H.

[73] Assignee: Nashua Corporation, Nashua, N.H.

[22] Filed: Jan. 26, 1976

[21] Appl. No.: 652,172

[52] U.S. Cl. .............................. 118/657; 427/18; 118/658

[51] Int. Cl.$^2$ ...................................... G03G 13/00

[58] Field of Search ................. 118/637; 355/3 DD; 427/18; 96/1 R

[56] References Cited

UNITED STATES PATENTS

| | | | |
|---|---|---|---|
| 3,176,652 | 4/1965 | Mott et al. | 118/637 |
| 3,863,603 | 2/1975 | Buckley et al. | 118/637 |
| 3,909,258 | 9/1975 | Kotz | 118/637 |

Primary Examiner—Henry S. Jaudon
Attorney, Agent, or Firm—Kenway & Jenney

[57] ABSTRACT

A system for developing a latent electrostatic image pattern formed on a coated photoconductive paper and which utilizes a nonconductive transfer cylinder that encloses a rotating cylindrical magnet. The magnet produces a longitudinally uniform magnetic field at the outer surface of the cylinder that draws a polarized, magnetically attractable, one component toner material over the outer surface of the transfer cylinder from a toner supply means to a deposit zone over the paper. A roller, plate, or other suitable unit under the paper supports the paper with a uniform, preselected minimum spacing between the transfer cylinder and the electrostatic image pattern on the paper. In the deposit zone electrostatic forces and gravitational forces urging the toner material from the transfer cylinder to the paper exceed the magnetic forces holding the toner on the transfer cylinder causing the toner to deposit selectively in the image areas. In one form, nonconductive support members for the magnet, the transfer cylinder and the paper support roller or other spacing control device cooperate with the nonconductive material forming or coating the transfer cylinder in blocking an electrical flow between the paper and the transfer cylinder.

13 Claims, 4 Drawing Figures

IMAGE DEVELOPING SYSTEM

BACKGROUND OF THE INVENTION

This invention relates in general to xerographic duplicating systems and more specifically to the development of a latent electrostatic image formed on a coated photoconductive paper by applying a polarized magnetically attractable, one component toner.

Many techniques are known for developing a latent electrostatic image with a powdered developer or toner material that adheres to the image pattern and thereby renders it visible. Some of the more common techniques include cascade development, magnetic brush development, development utilizing Van der Waal's forces as described in U.S. Pat. No. 3,166,432 to Gundlach, and liquid toner systems. Each technique has advantages and disadvantages, as discussed in U.S. Pat. No. 3,909,258 to Kotz, with the particular technique selected depending on factors such as the characteristics of the recording medium and the toner and the desired qualities of the developed image.

The cascade technique typically utilizes a two part toner of finely divided pigmented insulating particles carried on relatively large granular materials such as glass beads. The carrier material develops a triboelectric charge on the pigmented material (thereby polarizing the material) that is opposite in polarity to that of the image pattern on the recording medium. When this two part toner material is cascaded over the recording medium under the influence of gravity, the pigmented particles are drawn from the carrier beads to the latent image by an electrostatic attraction. Liquid toner techniques utilize a highly electrically insulating liquid as a carrier material for the pigmented particles. Both of these techniques suffer from the problems inherent in a two component toner where one part is continuously depleted. Other problems involve handling liquids and charged powders cascading under the influence of gravity.

U.S. Pat. No. 3,166,432 to Gundlach describes a development technique where a one part toner is held on a potential biased support member by Van der Waal's forces. Although this technique has the advantage of using a one component toner and produces copies with well filled solid areas, the Van der Waal's forces are weak and tend to vary between batches of the toner. Also, the deposit rate is sensitive to small irregularities in the support surface and changes in environmental factors such as the temperature and humidity.

Another technique applies the toner with a brush, or simulates a brush with a magnet that draws the developer particles across the recording surface. U.S. Pat. No. 2,846,333 to Wilson describes an early magnetic brush applicator in which a series of magnetic discs are mounted on a common rotating shaft in a skewed alignment with respect to the axis of rotation of the shaft. As the shaft is rotated, the shifting magnetic field generated by the discs brushes a magnetic developer material across the image bearing surface of a recording medium. U.S. Pat. No. 3,015,305 to Hall et al. describes a variation of the Wilson magnetic brush where a nonmagnetic insulating sleeve surrounds the rotating discs. This sleeve avoids the deposit of toner due to a current flow through the mass of developer material. As a result, the image has a sharp contrast and the development process is less time sensitive.

U.S. Pat. No. 3,455,276 to Anderson discloses another magnetic brush applicator that utilizes a sleeve that surrounds the magnet. In Anderson, although the sleeve can be nonconductive, it is described principally as a conductive element that can be maintained at a bias potential with respect to the recording surface. Also, Anderson uses a plurality of magnets aligned about a central rotating shaft of a magnetically permeable material. This segmented magnet structure achieves a generally uniform magnetic field along lines parallel to the axis of rotation of the magnet, with lines of equal force being angularly spaced in correspondence with the planes of abutment between adjacent segments of the magnet. As in Wilson and Hall, the toner is brushed into direct contact with the recording surface (there is no air gap between the toner and the recording surface during the deposit). In the Anderson developing system, the deposit occurs in a direction transverse to the direction of the force of gravity.

In contrast to these magnetic brush techniques that draw the developer material over the recording surface, U.S. Pat. No. 3,909,258 to Kotz discloses an applicator that utilizes a rotating segmented magnet housed within a sleeve, but the development process depends on the conduction of an electrical current along chains of a conductive developer material that bridge an air gap between the recording surface and the sleeve. The Kotz system therefore requires that the sleeve be conductive. Also, the deposit of developer material is a function of the electrical potential of the sleeve. This potential is either an applied bias potential, an induced potential due to the current flow, or a combination of applied and induced voltages. Deposit of the developer material, as well as the rate and uniformity of deposit, depend on a careful balance of the forces exerted on the developer material by the magnet, the latent image pattern, and the sleeve. Further, this development technique is relatively sensitive to time since the period of time in which the developer material remains in the nip region between the sleeve and the recording material is very important.

It is therefore a principal object of the invention to provide a system for developing a latent electrostatic image pattern carried in a photoconductive layer coated on paper with a dry, one component toner material carried on a support member in a uniform layer, and spaced uniformly over the latent image pattern, without an electrical flow between the paper and the support member.

Another object of the invention is to provide a development system that reduces the variables effecting the rate and uniformity of deposit, has a good degree of exposure latitude, and affords good control over the toner material.

A further object is to provide a system for high quality development of latent electrostatic images on coated photoconductive paper with a dry, one component toner.

SUMMARY OF THE INVENTION

The image development system of this invention utilizes a nonconductive toner support member of transfer cylinder that encloses a rotating cylindrical magnet that generates a longitudinally uniform magnetic field at the outer surface of this cylinder. Rotation of the magnet carries a dry, polarized, magnetically attractable, one component toner material from a toner supply means that dispenses a substantially uniform layer of the toner over the outer surface of the transfer cylinder. Continued rotation of the magnet carries the layer of toner material to a deposit zone defined by the nip between the transfer cylinder and a coated photoconductive paper that carries the latent image pattern.

The spacing between the transfer cylinder and the image pattern on the paper is selected so that the toner deposits in the image areas where the electrostatic attractive force of the image pattern and the gravitational force exceeds the attractive force of the magnet. The transfer cylinder is formed from or coated with a nonconductive material that prevents an electrical flow between the coated paper recording material and the cylinder or associated structures. In one form, the spacing between the transfer cylinder and the paper is determined by a pair of nonconductive bushings mounted at the ends of a paper support roller positioned below the paper and the transfer cylinder. Other supporting or spacing structures for the magnet and the sleeve can also be formed of nonconductive material to further ensure that there is no electrical flow between the paper and the transfer cylinder. In addition, the paper support means and space control means may be made of electrically, nonconductive materials.

These and other features and objects of the invention will be more fully understood from the following detailed description of the preferred embodiments which should be read in conjunction with the accompanying drawings.

DETAILED DESCRIPTION OF THE PREFERRED EMBODIMENTS

Figure 1:
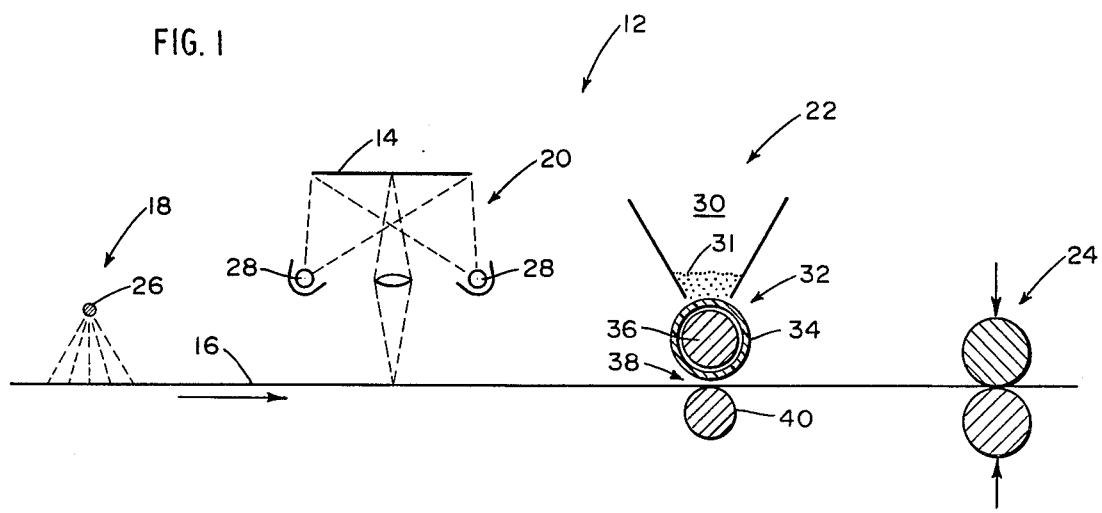
FIG. 1 is a highly simplified schematic view of a xerographic duplicating system incorporating a developing system constructed according to the invention.

FIG. 1 shows in a highly simplified diagramatic form a xerographic duplicating apparatus 12 for producing duplicate copies of an original specimen document 14 and the like on a sheet of coated photoconductive paper 16. The paper 16 can be any standard coated, xerographic paper, but is preferably a paper utilizing zinc oxide as the photoconductive material such as that sold by the Nashua Corporation of Nashua, New Hampshire. Although the paper 16 is shown as a continuous sheet, it will be understood that individual sheets of coated paper can also be used.

The apparatus 12 is organized into four sequential processing stations 18, 20, 22 and 24. The first station 18 charges the paper with a corona discharge device 26 that places a uniform high potential electrostatic charge on the paper. Once charged the paper advances to the exposure station 20 where the document to be copied is exposed to a conventional high intensity light source 28 and scanned using well known opical techniques to produce a latent electrostatic image pattern in the photoconductive coating that corresponds to the pattern of characters on the specimen document 14. In the non-image areas struck by the light, the photoconductive material has a decreased resistivity following the exposure which allows the charge to dissipate. In the image areas the photoconductive material maintains its high dark resistivity and little or no charge leaks off.

The developing station 22, which is the subject of the present invention, applies a toner material to the image bearing surface of the paper to render the latent electrostatic pattern visible. The toner or developer material is in the form of finely divided particles that are polarized so as to be electrically of the opposite polarity to that of the electrostatic image pattern. The toner material therefore is selectively attractive to and collects at the charged image areas in preference to the non-image areas that have a relatively low potential, typically near ground.

At the developing station, a hopper 30 holds a supply of the toner material 31 and continuously feeds a uniform layer of the toner to a toner applicator assembly, indicated generally at 32, having a stationary, nonconductive transfer cylinder 34 that surrounds a rotating magnet 36. The magnet 36 generates a magnetic field at the outer surface of the transfer cylinder 34 that is substantially uniform along the length of the cylinder. Rotation of the magnet carries the uniform layer of the toner material from the hopper 30 to a deposit zone 38 directly over the image bearing surface of the paper 16. At the deposit zone the toner carried on the transfer cylinder is spaced closely from the paper 16 with the spacing controlled in part by a paper support roller 40 located below the transfer cylinder. The developing station 20, which will be described in greater detail hereinbelow, operates in conjunction with a dry, polarized, magnetically attractable, one component toner material. A suitable toner material is available from Nashua Corporation of Nashua, N.H.

When the image is thus developed, the toner material is fixed on the paper at the final station 24. The fixing technique may comprise pressure fusing, utilizing the mechanical force of an opposed pair of pressure rollers to squeeze the toner material into the paper. Fusing pressures in the range of 80 to 100 pounds per square inch have been found suitable. Of course, heat fusing, heat/pressure fusing, or other fusing techniques known in the art may be employed.

Figure 2:
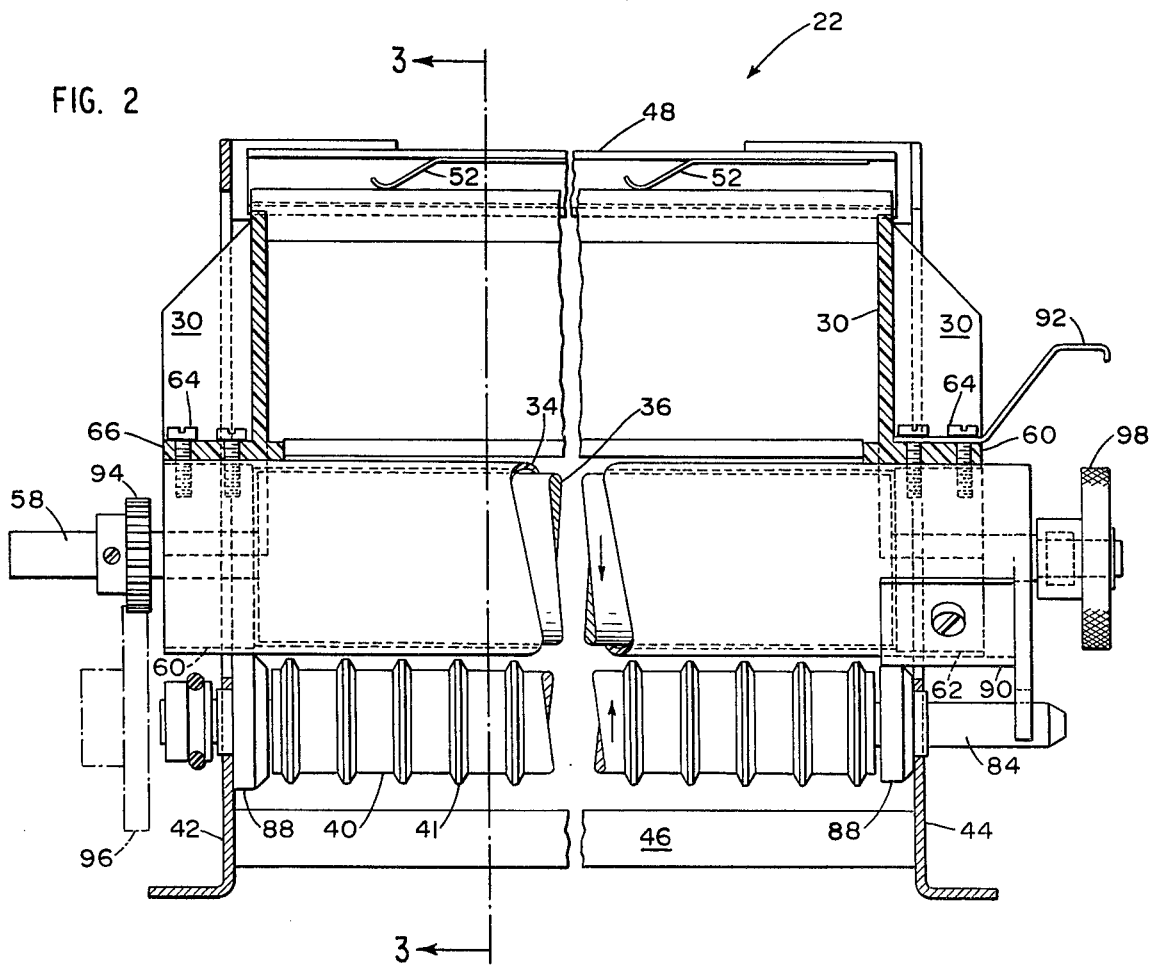
FIG. 2 is a front elevational view in partial section with portions broken away of the development system shown in FIG. 1.
Figure 3:
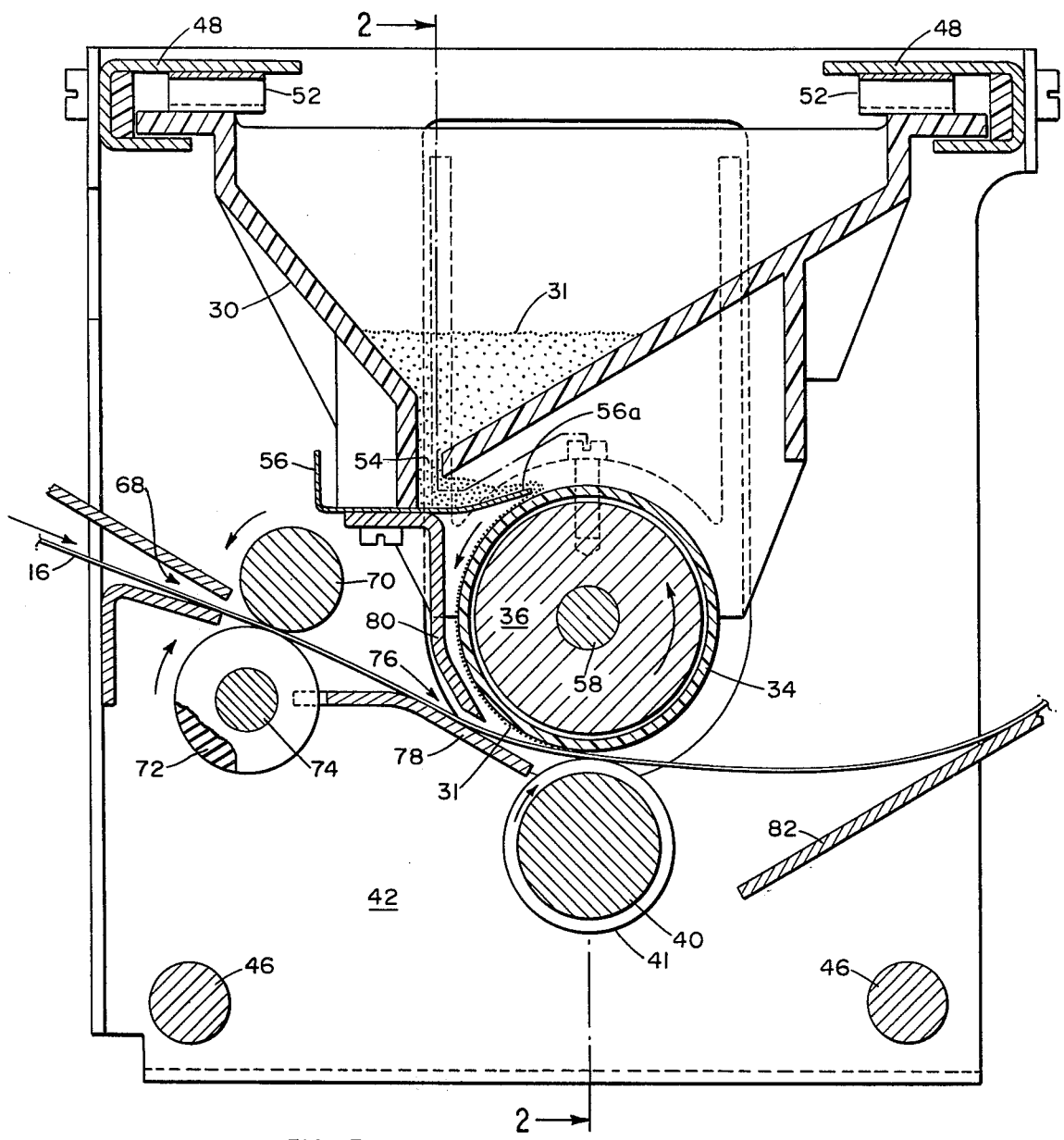
FIG. 3 is a view in vertical section taken along the line 3—3 of FIG. 2.
Figure 4:
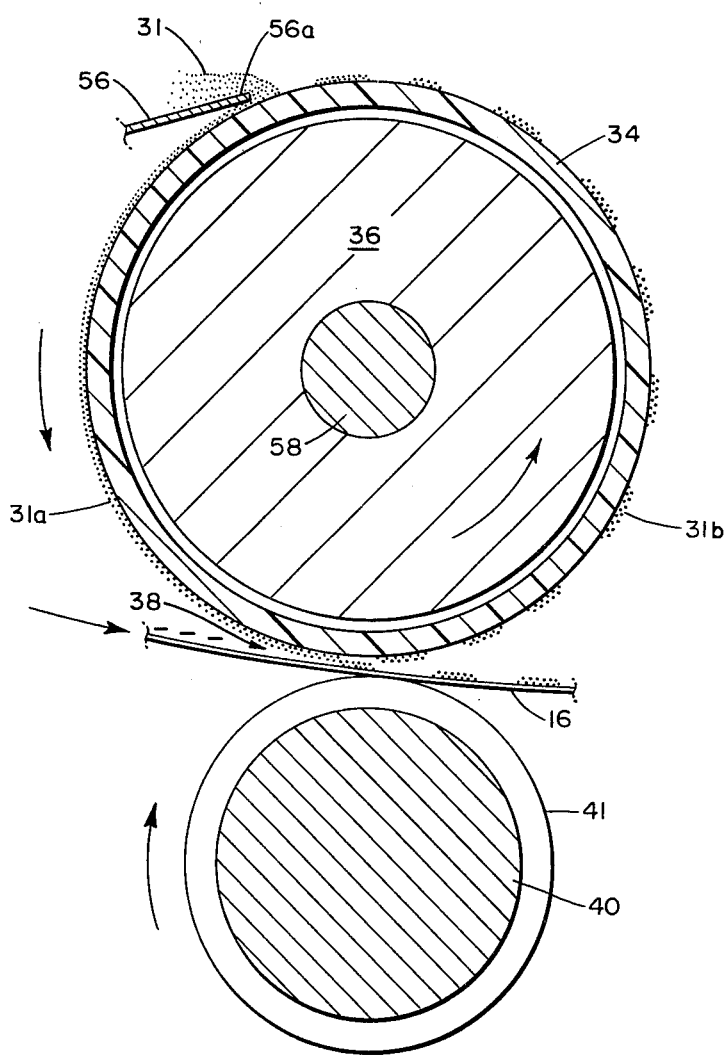
FIG. 4 is a detailed view corresponding to FIG. 3 of the transfer cylinder, magnet, paper and the paper support roller.

FIGS. 2–4 illustrate a preferred embodiment of a developing station 22 constructed according to the invention. The station 22 has a pair of side support structures 42 and 44 that are secured in a generally parallel spaced relationship by a pair of longitudinally extending support rods 46 located at the lower portion of the station and a pair of track members 48 secured near the upper end of the side plates. Held in a sliding relationship within the tracks 48 is the converging wall hopper 30 that holds a supply of the toner material 31. The hopper 30 is positioned in the tracks 48 by spring clips 52 secured to the upper guide members of the tracks 48. The hopper 30 is preferably formed from a suitable plastic material such as that sold under the trade designation Bakelite. The hopper has a longitudinally extending opening 54 at its lowermost point that feeds the toner material 31 onto the top surface of a doctor blade 56. The toner material accumulates on the doctor blade with a small portion of the toner falling off the leading edge 56a which is closely and uniformly spaced from the outer surface of the transfer cylinder 34 (FIG. 4).

The transfer cylinder 34 can be formed from any suitable nonmagnetic, nonconductive structural material such as anodized aluminum or a suitable thermosetting plastic having high chemical and electrical resistance such as material sold under the trade designation Bakelite. However, the cylinder can also be formed from a metallic material provided that the surface of the material is fully coated with an insulating material to prevent the flow of electrical current to the underlying metal structure. The outer surface of the transfer cylinder is preferably highly smooth to facilitate movement of the toner material 31 over it and manufactured to close dimensional tolerances to ensure that the spacings between the cylinder and the edge 56a and the paper 16 are highly uniform.

The magnet 36 is a single piece, magnet formed from ferrite materials held in an immobilizing resin matrix and providing circumferentially alternating zones of opposite radially oriented magnetic fields. The magnet 36 has a generally cylindrical shape and generates a magnetic field that is substantially, longitudinally uniform over the outer surface of the transfer cylinder along its length, albeit alternating in a circumferential direction. The magnet 36 is rotatably mounted in a spaced relationship with the cylinder 34 on a shaft 58 journaled in bearing members 60 and 62. The bearings 60 and 62, as well as the transfer cylinder 34, are fixed against rotation by screws 64 that pass through the flanges 66 formed on the hopper 30, the cylinder 34, and thread in holes formed in the bearings 60 and 62. Rotation of the magnet against the doctor blade (counterclockwise as shown) carries a thin, uniform layer 31a (FIG. 4) of the magnetically attractable toner material 31 over the outer surface of the transfer cylinder in the same direction. The thickness of the toner layer is determined by the spacing between the edge 56a and the surface of the transfer cylinder. Continued rotation of the magnet carries the toner layer to the deposit zone 38, and carries the toner 31b not deposited on the paper 16 in the deposit zone back to the doctor blade to be redistributed with additional toner into the layer 31a.

The paper 16 is advanced and guided through the developing station 22 by a series of guide elements and rollers. A converging wall chute 68 guides the paper into the nip between a paper feed roller 70 and wheels 72 mounted on a shaft 74. The rollers 70 and the wheels 72 advance the paper through the converging wall guide chute 76 formed between a lower plate 78 and an upper plate deflector plate 80 that also shields the transfer cylinder 34. The guide chute 76 directs the paper to the upper surface of the paper support roller 40 that has a series of axially spaced ribs 41 that contact the underside of the paper. When the paper leaves the deposite zone 38 between the transfer cylinder and the paper support roller, an exit plate 82 directs it to the fixing station 24.

The roller 40 is carried on a shaft 84 that rotates within gap spacer bearings 86 and 88 mounted in the side plates 42 and 44, respectively. The bearing 86 is in direct contact with the transfer cylinder 34 and the bearing 88 supports a shim 90 secured to the magnet bearing 62 through the cylinder 34. The diameter of the bushings 86 and 88 therefore control the spacing between the paper carried on the support roller 40 and the transfer cylinder 34. The roller 40 can be made of any material yielding satisfactory paper support and spacing control properties and may be wholly made of electrically, nonconductive material such as plastic, etc.

The bearings 86 and 88 are formed from a structural material such as brass which is readily machined and has good wear resistance qualities. However, the bearings 86 and 88 and the shim 90 can be constructed from an insulating material to block any electrical flow between the paper 16 and the transfer cylinder 34 or associated structures. The gap bearings 86 and 88 are also chamfered on the edges facing the magnet bearing 64 to facilitate the sliding insertion of the applicator assembly including the transfer cylinder and the enclosed magnet which are secured to the hopper 30 carried in the tracks 48. A handle 92 facilitates the insertion and removal of the hopper and applicator assembly.

The rotation of the magnet shaft 58, the paper support roller shaft 84, the paper feed shaft 74 and the roller 70 are interconnected by suitable gear arrangements. In particular, a gear (not shown) secured to the paper support roller shaft 84 is operatively connected with a gear 94 mounted on the magnet shaft 58 through an intermediate idler gear 96. The shaft 74, roller 70 and paper support roller 40 are interconnected to rotate in unison at substantially the same speed. A knob 98 secured on the magnet shaft 58 on the side opposite the gear 94 facilitates manual rotation of the magnet 36 and the paper support roller 40.

FIG. 4 shows the relations between the doctor blade 56, the transfer cylinder 34, the paper 16, and the paper support roller 40. As described above, the rotation of the magnet 36 carries a highly uniform layer 31a of the toner material from the doctor blade 56 to the deposit zone 38 over the paper 16. In the deposit zone the toner selectively deposits on the image areas of the paper 16. In the image areas, the electrostatic attraction between the charge in the image area and the polarized toner, in cooperation with the force of gravity which is generally aligned with the electrostatic attractive force, overcomes the magnetic force that holds the toner layer 31a on the cylinder. In the non-image areas, the magnetic force exceeds the gravitational force and the electrostatic attraction between the toner particles and the residual potential, typically near ground and markedly less than the charge in the image areas.

It should be noted that the minimum spacing between the paper and the cylinder in the deposit zone is fixed for a given set of bearings 86 and 88. Therefore, in normal operation there are only two variables affecting the deposit process, the strength of the magnetic field and the strength of the electrostatic charge in the latent image pattern. Moreover, since the magnetic field is substantially constant across the paper in a direction transverse to its direction of advance, the deposit is highly reflective of the latent image pattern, as is desired, and relatively independent of variable factors such as temperature, humidity, and minor variations in the smoothness of the exterior surface of the cylinder 34. Of course, other factors that can be varied are taken as fixed since they can be controlled with a high degree of reliability. Some of these factors include the initial charge placed on the paper at the changing station 18, the nature and characteristics of the paper 16, the thickness of the layer 31a, and the magnitude of the electrical polarization of the toner particles.

It should also be noted that the paper advance rate is preferably coordinated with the rate of rotation of the magnet 36 to place a fresh, uniformly thick layer 31a of toner in the deposit region sufficient to fully develop the latent image, especially solid areas. As noted above, the toner material 31b not deposited in the zone 38 is carried by the magnet around the transfer cylinder 34 back to the doctor blade 56. However, the deposit process is relatively time insensitive which allows a good exposure latitude.

Although the invention has been described with the cylinder 34 stationary and the magnet 36 rotating, it is contemplated that the cylinder can rotate in unison with the magnet. Further, although the magnet 36 has been described as a nonsegmented, generally cylindrical, ferrite magnet that generates a longitudinally uniform magnetic field at the outer surface of the surrounding transfer cylinder, other magnet structures or electromagnetic devices can be used provided they generate the required magnetic field needed to hold the toner on and carry the material over the transfer cylinder. Other modifications will become apparent to those skilled in the art from the foregoing description and the accompanying drawings. Such modifications are intended to fall within the scope of the appended claims.

I claim:

1. Apparatus for developing with a polarized, magnetically attractable, one component toner material a latent electrostatic image formed on a coated photoconductive paper, comprising, in combination,
    a toner support member having a smooth outer surface,
    means for generating a substantially longitudinally uniform magnetic field at said outer surface of said support member,
    means for dispensing a layer of said toner material of substantially uniform thickness on said outer surface of said support member,
    means for preventing an electrical flow between said support member and said paper, and
    means for moving said layer of toner material from said dispensing means to a deposit zone where said support member is spaced from said paper so that an electrostatic attractive force between said toner material and the latent electrostatic image exceeds the force of said magnetic field that tends to hold the toner material on the outer surface of said support member thereby causing said toner material to deposit selectively on said latent image,
    said spacing being sufficiently large to avoid contact between said paper and said layer of toner material disposed on said support member, and
    said electrical flow prevention means eliminating electrical flow induced variations in the deposit of said toner material from said support member to said latent image.

2. Developing apparatus according to claim 1 in which said electrical flow prevention means comprises means forming said support member from a nonconductive material.

3. Developing apparatus according to claim 1 in which said electrical flow prevention means comprises a nonconductive coating on at least the outer surface of said support member.

4. Developing apparatus according to claim 1 in which said support member is located above said paper in said deposit zone so that the gravitational force acting on said toner material is generally aligned with said electrostatic force to selectively deposit said toner material on said latent image.

5. Developing apparatus according to claim 1 in which said magnetic field generating means comprises a magnet disposed within said support member.

6. Developing apparatus according to claim 5 in which said toner layer moving means comprises means for rotating said magnet.

7. Developing apparatus according to claim 6 further comprising means for advancing said paper through said deposit zone in coordination with said rotation.

8. Apparatus for developing with a polarized, magnetically attractable, one component toner material a latent electrostatic image formed on a coated photoconductive paper, comprising in combination,
    a nonconductive transfer cylinder having a hollow, generally cylindrical configuration and a smooth outer surface,
    rotatable magnet disposed within said transfer cylinder that establishes a longitudinally uniform magnetic field at said outer surface of said transfer cylinder,
    means for dispensing a layer of said toner material of substantially uniform thickness on said outer surface of said transfer cylinder,
    means for advancing said paper below said transfer cylinder in a direction substantially transverse to the longitudinal axis of said transfer cylinder with said paper uniformly spaced from said transfer cylinder,
    support means for said magnet, said transfer cylinder and said paper advance means which are nonconductive to assist in preventing an electrical flow between said paper and said transfer cylinder, and
    means for rotating said magnet to move said layer of toner material from said dispensing means to a deposit zone over said paper where an electrostatic attractive force between said toner material and the latent electrostatic image and the gravitational force acting on said toner material exceeds the attractive force of said magnet on said toner material thereby causing said toner material to deposit selectively on said latent image,
    said spacing being sufficiently large to avoid contact between said paper and said layer of toner material disposed on said transfer cylinder, and
    said nonconductive transfer cylinder and said nonconductive support means eliminating electrical flow induced variation in the deposit of said toner material from said transfer cylinder to said latent image.

9. Developing apparatus according to claim 8 in which said transfer cylinder is formed of anodized aluminum.

10. Developing apparatus according to claim 8 in which said transfer cylinder is formed from a thermosetting plastic material that has high chemical and electrical resistance.

11. Developer apparatus according to claim 8 in which said transfer cylinder is stationary.

12. Developer apparatus according to claim 8 in which said transfer cylinder rotates about its longitudinal axis in unison with said magnet.

13. Developer apparatus according to claim 8 in which said paper advance support means is coordinated with said magnet rotating means.

* * * * *